United States Patent
Bali et al.

(10) Patent No.: US 9,300,549 B2
(45) Date of Patent: Mar. 29, 2016

(54) METHOD AND APPARATUS FOR MEASURING END-TO-END ACCESSIBILITY IN VOICE OVER LONG TERM EVOLUTION NETWORKS

(71) Applicant: AT&T Intellectual Property I, L.P., Atlanta, GA (US)

(72) Inventors: Soshant Bali, Danville, CA (US); Guangtian Liu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 176 days.

(21) Appl. No.: 14/092,844

(22) Filed: Nov. 27, 2013

(65) Prior Publication Data

US 2015/0146554 A1    May 28, 2015

(51) Int. Cl.
*H04L 12/24* (2006.01)
*H04L 12/26* (2006.01)
*H04W 24/08* (2009.01)

(52) U.S. Cl.
CPC ........ *H04L 41/5009* (2013.01); *H04L 43/0811* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 7,421,510 B2 * | 9/2008 | Padmanabhan et al. | 709/235 |
| 8,549,358 B2 | 10/2013 | Yang et al. | |
| 2003/0018450 A1 * | 1/2003 | Carley | 702/179 |
| 2003/0091165 A1 * | 5/2003 | Bearden et al. | 379/88.08 |
| 2005/0220035 A1 * | 10/2005 | Ling et al. | 370/252 |
| 2011/0141925 A1 | 6/2011 | Velenko et al. | |
| 2011/0275365 A1 | 11/2011 | Fischer et al. | |
| 2013/0064096 A1 * | 3/2013 | Degioanni et al. | 370/241 |
| 2013/0083667 A1 | 4/2013 | Persson et al. | |
| 2013/0242785 A1 | 9/2013 | Guo | |
| 2013/0272139 A1 | 10/2013 | Guo et al. | |

FOREIGN PATENT DOCUMENTS

EP    2230866 A1    9/2010

* cited by examiner

*Primary Examiner* — Kerri Rose

(57) ABSTRACT

In one embodiment, a method for estimating end-to-end accessibility in a voice over long term evolution network includes aggregating data, by a processor, from a plurality of sources in the network relating to calls originating from and terminating in the network, where the data indicates success rates for a plurality of procedures initiated by placement of the calls, and calculating, by the processor, a metric indicative of the end-to-end accessibility from the data.

18 Claims, 4 Drawing Sheets

METHOD AND APPARATUS FOR MEASURING END-TO-END ACCESSIBILITY IN VOICE OVER LONG TERM EVOLUTION NETWORKS

FIELD OF THE DISCLOSURE

The present disclosure relates generally to network communications and relates more particularly to techniques for measuring end-to-end accessibility in Voice over Long Term Evolution (VoLTE) networks.

Long Term Evolution (LTE) is a standard for wireless communication of high-speed data for mobile devices that supports, among other types of communications, voice calls. One approach to supporting voice calling using the LTE standard is Voice over LTE (VoLTE), which is based on the Internet Protocol (IP) Multimedia Subsystem (IMS) network. This approach results in the voice service being delivered as data flows within the LTE data bearer. It is expected that VoLTE networks will eventually replace the existing circuit switched mobile voice networks supported by at least some service providers.

One key metric used by service providers to measure the quality of their networks' services is accessibility. Accessibility is a measure of the probability that the network will provide the voice service that the end user requested (e.g., the probability that the end user is able to connect a call). Conventional hardware-based solutions for measuring end-to-end accessibility are device-specific and thus will not work with every device. Moreover, hardware-based accessibility algorithms may fail to identify some network failures, because the devices do not have visibility into the network.

SUMMARY

In one embodiment, a method for estimating end-to-end accessibility in a voice over long term evolution network includes aggregating data, by a processor, from a plurality of sources in the network relating to calls originating from and terminating in the network, where the data indicates success rates for a plurality of procedures initiated by placement of the calls, and calculating, by the processor, a metric indicative of the end-to-end accessibility from the data.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for measuring end-to-end accessibility in Voice over Long Term Evolution (VoLTE) networks. Embodiments of the disclosure aggregate data from several different sources within the network in order to estimate the end-to-end accessibility. When an end user places a call, several different procedures are initiated, and the end-to-end call can only be established when all of these procedures are successfully executed. The success and failure rates of both Long Term Evolution (LTE) and Internet Protocol (IP) Multimedia Subsystem (IMS) procedures are measured (e.g., using network counters) and used to estimate the accessibility.

Within the context of the present disclosure, two types of accessibility are considered: mobile originated (Mo) and mobile terminated (Mt). Mobile originated refers to calls that originate in the mobile network, while mobile terminated refers to calls that terminate in the mobile network. How accessibility is measured will vary depending on whether the mobile network was the source or destination of a call.

Figure 1:
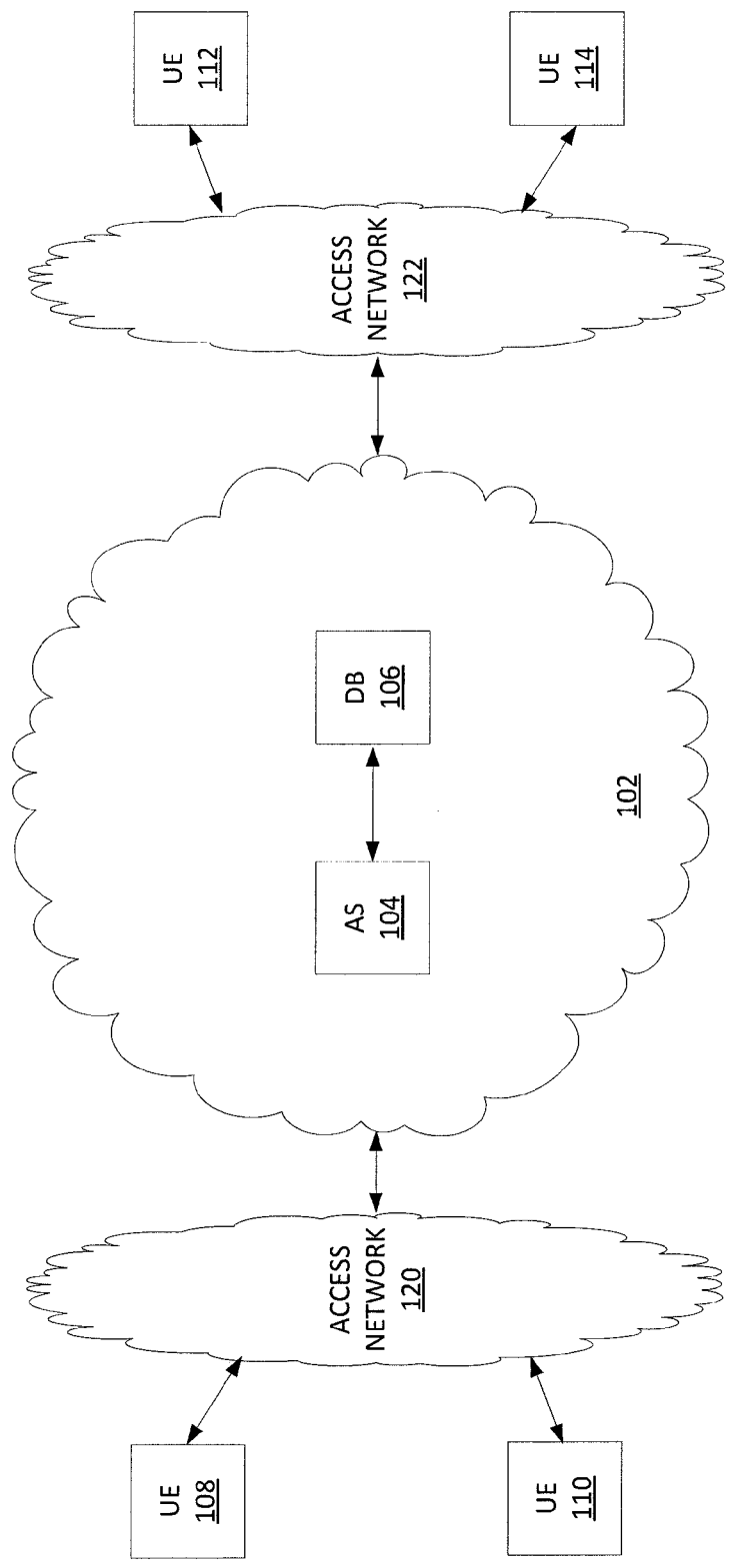
FIG. 1 is a block diagram depicting one example of a communications network.

FIG. 1 is a block diagram depicting one example of a communications network 100. The communications network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed.

Figure 4:
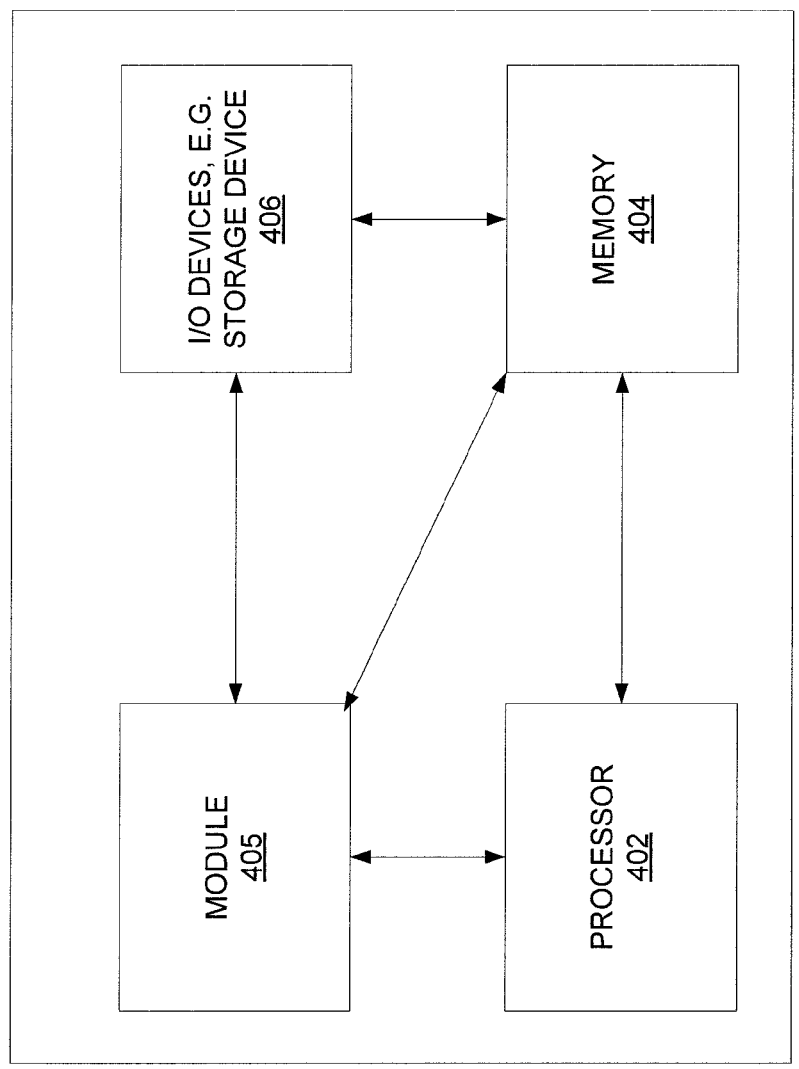
FIG. 4 is a high level block diagram of the change suggestion method that is implemented using a general purpose computing device.

In one embodiment, the AS 104 may comprise a general purpose computer as illustrated in FIG. 4 and discussed below. In one embodiment, the AS 104 may perform the methods and algorithms discussed below related to measuring end-to-end accessibility.

In one embodiment, the DB 106 may store data relating to calls originating and/or terminating in the network 100. This data may be detected by network counters and stored in the DB 106, where the AS 104 may access them when it is prepared to estimate accessibility. For example, the DB 106 may store data relating to the number of calls originating and/or terminating in the network, the number of these calls that were deemed successful, and the number of these calls that failed.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device such as a desktop computer or a mobile endpoint device such as a cellular telephone, a smart phone, a tablet computer, a laptop computer, a netbook, an ultrabook, a tablet computer, a portable media device (e.g., an MP3 player), a gaming console, a portable gaming device, and the like. It should be noted that although only four user endpoint devices are illustrated in FIG. 1, any number of user endpoint devices may be deployed.

It should be noted that the network 100 has been simplified. For example, the network 100 may include other network elements (not shown) such as border elements, routers, switches, policy servers, security devices, a content distribution network (CDN) and the like.

Figure 2:
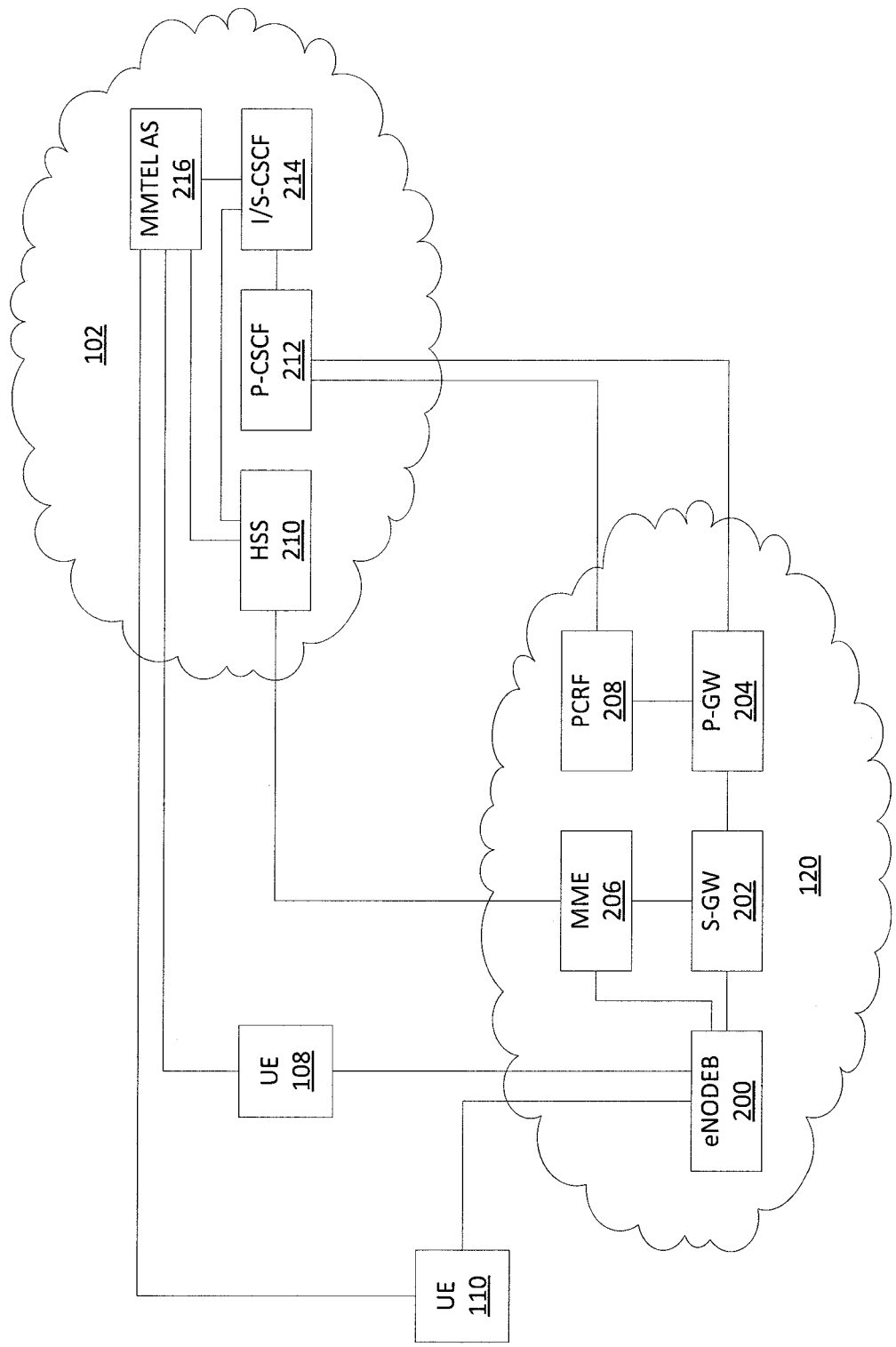
FIG. 2 is a block diagram depicting a portion of the communications network of FIG. 1 in greater detail.

FIG. 2 is a block diagram depicting a portion of the communications network 100 of FIG. 1 in greater detail. In particular, FIG. 2 illustrates some key components of the core network 102 and the access network 120 (both access networks 120 and 122 may be configured as illustrated, but only access network 120 is shown for the sake of simplicity). The illustrated components are not meant to represent an exhaustive list of the components of each network, but rather represent the unique components necessary to support VoLTE service.

Components of the access network 120 include an evolved Node B (eNodeB) 200, a serving gateway (S-GW) 202, a PDN gateway (P-GW) 204, a mobility management entity (MME) 206, and a policy charging and rules function (PCRF) 208.

The eNodeB 200 interfaces with the user endpoint devices 108, 110 and performs a plurality of functions including radio resource management, admission control, scheduling, enforcement of quality of service (QoS), cell information broadcast, ciphering and deciphering if user and control plane data, and compression and decompression of user plane packet headers. To this end, the eNodeB 200 hosts a plurality of layers (i.e., physical, medium access control, radio link control, and packet data convergence protocol) that include the functionality of user-plane header-compression and encryption.

The S-GW 202 routes and forwards user data packets. In particular, all IP packets (signaling plus bearer) traverse the S-GW 202, which is the local mobility anchor for bearers when the user endpoint device 108 or 110 moves between different eNodeBs or hands over to legacy 2G or 3G network access.

The P-GW 204 provides connectivity between the user endpoint devices 108, 110 and external packet data networks. Specifically, the P-GW 204 provides IP address management, QoS enforcement, and flow-based charging according top policy rules received from the PCRF 208 in order to act as a mobility anchor for non 3GPP technologies (e.g., CDMA, WiMAX, WiFi, fixed broadband networks). The P-GW 204 also connects IP bearers to the packet data networks.

The MME 206 is the key control node for the LTE access network. The MME 206 processes the signaling between the user endpoint devices 108, 110 and the core network 102. To this end, the MME 206 performs bearer management (establishment, maintenance, and release) and connection management (establishing the data connection between the user endpoint device 108, 110 and the core network 102).

The PCRF 208 provides policy control decisions and flow-based charging controls. In particular, the PCRF 208 instructs the network about enforcement of QoS policies based on information received from a subscriber policy repository, which may be part of the core network 102 (e.g., VoLTE or video bearer identifications).

Components of the core network 102 include a home subscriber server (HSS) 210, a proxy call session control function (P-CSCF) 212, an interrogating/serving call session control function (I/S-CSCF) 214, and a multimedia telephony application server (MMTel AS) 216.

The HSS 210 is a database that contains user-related and subscription-related data (e.g., QoS profiles, identification, authorization, and provisioned services). The HSS provides this information to the MME during user authentication.

The P-CSCF 212 is the initial point of contact for session signaling for the user endpoint devices 108, 110. In particular, the P-CSCF operates as a session initiation protocol (SIP) proxy by forwarding SIP messages between the user endpoint devices 108, 110 and the core network 102.

The I/S-CSCF 214 is the contact point within the core network 102 for all connections destined to a user of the core network 102. On IMS registration, it interrogates the HSS 210 to determine to which serving call session control function (S-CSCF) to route the request for registration. For mobile terminating calls, the I/S-CSCF 214 interrogates the HSS 210 to determine on which S-CSCF the user is registered. The I/S-CSCF 214 provides session set-up, session tear-down, session control, and session routing functions. The I/S-CSCF 214 generates records for billing purposes for all sessions under its control and invokes applications using application servers. The I/S-CSCF 214 also acts as a SIP registrar for user endpoint devices that the HSS 210 and I/S-CSCF 214 assign to it. The I/S-CSCF 214 queries the HSS 210 for the applicable user profiles and handles calls involving the user endpoint devices once the users have been registered. Depending on the function being performed, the description may make reference to the I/S-CSCF 214 as the "I/S-CSCF," the "I-CSCF," or the "S-CSCF."

The MMTel AS 216 is an IMS application server that provides support for multimedia telephony services as defined by 3GPP (e.g., supplementary service functionality).

In operation, multiple bearers are typically running on the user endpoint devices 108, 110 (e.g., covering the default bearer, streaming video, SIP signaling, in-progress VoLTE calls, etc.). Each of these services may have different QoS requirements, which can be managed as a group. The LTE bearer structure ensures that each receives the QoS it requires, even when multiple applications are being used simultaneously. For each bearer, the access network 120 assigns a QoS class identifier (QCI) level. Each QCI is characterized by resource type of guaranteed or non-guaranteed bit rate, priority during congestion, packet delay budget, and packet error loss rate; thus, the QCI determines how a bearer is handled all the way from the user endpoint device 108, 110 to the core network 102.

When a user originates or answers a voice call, an LTE bearer with QCI=1 is established. Any interference with the bearer comes from applications running concurrently on the user endpoint device 108, 110 rather than from contention for shared resources in the radio's connection, mobile backhaul from the cell site, or the like.

Figure 3:
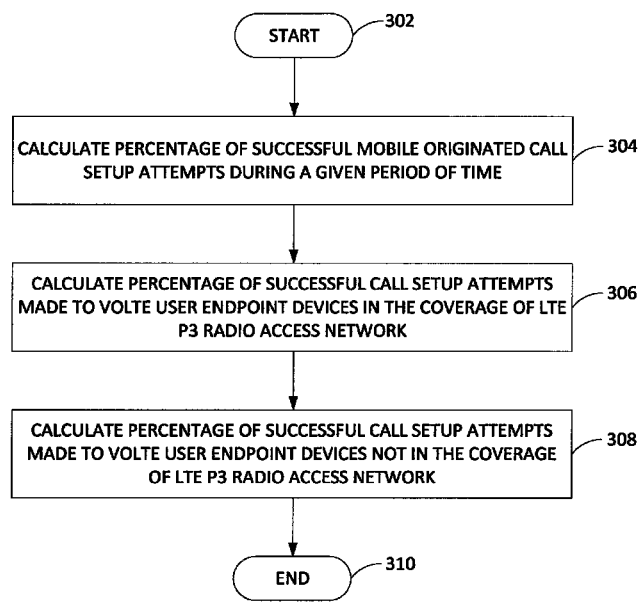
FIG. 3 illustrates a flowchart of a method for estimating end-to-end accessibility.

FIG. 3 illustrates a flowchart of a method 300 for estimating end-to-end accessibility. In particular, the method 300 computes a plurality of performance indicators that measure the accessibility of a network, which in one embodiment is a VoLTE network. In one embodiment, the method 300 may be performed by the AS 104 or a general purpose computing device as illustrated in FIG. 4 and discussed below.

The method 300 begins in step 302. In step 304, the AS 104 calculates the percentage of successful mobile originated call setup attempts during a given period of time. In one embodiment, the call setup attempts for the purposes of this calculation are aggregated per eNodeB cell and/or per call type (e.g., VoLTE to VoLTE, VoLTE to 3G, etc.). In one embodiment, the percentage of successful mobile originated call setup attempts is calculated as the percentage of successful mobile originated SIP bearer activation attempts multiplied by the percentage of successful mobile originated VoIP call setup attempts given that the SIP bearer has been activated successfully, divided by one hundred.

In one embodiment, the percentage of successful mobile originated SIP bearer activation attempts is calculated as the number of successfully established radio resource control connections for mobile originated data requests divided by the number of original (not repeated) radio resource control connection requests received by the eNodeB 200 for mobile originated data requests, multiplied by the number of successful S1 signaling connections established for mobile originated data requests divided by the number of S1 signaling connection establishment attempts made by the eNodeB 200 for mobile originated data requests, multiplied by the number of successfully established SIP bearer Evolved Universal Terrestrial Radio Access Network radio access bearers (E-RABs) divided by the number of SIP bearer ERAB establishment attempts.

In one embodiment, the percentage of successful mobile originated VoIP call setups attempts given that the SIP bearer has been activated successfully is calculated as the number of successful mobile originated VoIP call setup attempts of the specified type divided by the number of mobile originated VoIP call setup attempts of the specified type.

In one embodiment, the number of successful mobile originated VoIP call setup attempts of the specified type is aggregated per eNodeB cell, and the calculation varies depending on whether the call setup is VoLTE to VoLTE or VoLTE to non VoLTE. In one embodiment, a VoLTE to VoLTE call setup is considered successful when: (1) a SIP INVITE response at the mobile originated P-CSCF is [200, 404, 480, 484, 486, 487, 600, 603]; and (b) when the SIP INVITE response at the mobile originated P-CSCF is 200 OK, additionally: (a) the 200 OK is not due to call forwarding not reachable at the mobile terminated telecom application server; and (b) the mobile terminated dedicated bearer setup is considered successful when the mobile terminated user endpoint device is within a VoLTE-enabled radio access network (RAN), the mobile terminated user answered the call, and the time between the session description protocol (SDP) Answer and the SIP BYE is shorter than a threshold period of time; and (c) the mobile originated dedicated bearer setup is considered successful when the time between the SDP Answer and the SIP BYE is shorter than a threshold period of time (which may or may not be equal to the threshold period of time discussed in (b)). In one embodiment, a 480 SIP INVITE response at the mobile originated P-CSCF is considered indicative of a successful call attempt except when the mobile originated telecom application server's call detail records indicate that the call was redirected to the announcement sever because the P-Access Network Information (p-ANI) in the SIP INVITE was invalid.

In one embodiment, a VoLTE to non-VoLTE call setup is considered successful when: (1) a SIP INVITE response at the mobile originated P-CSCF is [200, 404, 480, 484, 486, 487, 600, 603]; and (b) when the SIP INVITE response at the mobile originated P-CSCF is 200 OK, additionally: (a) the mobile originated dedicated bearer setup is considered successful when the time between the session description protocol (SDP) Answer and the SIP BYE is shorter than a threshold period of time. In one embodiment, a 480 SIP INVITE response at the mobile originated P-CSCF is considered indicative of a successful call attempt except when the mobile originated telecom application server's call detail records indicate that the call was redirected to the announcement sever because the p-ANI in the SIP INVITE was invalid.

In one embodiment, the number of mobile originated VoIP call setup attempts of the specified type is aggregated per eNodeB cell. In one embodiment, the number of mobile originated VoIP call setup attempts of the specified type is calculated as the number of mobile originated SIP INVITES of the specified type observed at the P-CSCF minus the number of 3xx responses to mobile originated SIP INVITES of the specified type observed at the P-CSCF. Both the number of mobile originated SIP INVITES and the number of 3xx responses to mobile originated SIP INVITES may be calculated using the P-CSCF's call detail records.

In step 306, the AS 104 calculates the percentage of successful call setup attempts made to VoLTE user endpoint devices that are in the coverage of VoLTE-enabled RAN. In one embodiment, the call setup attempts made to VoLTE user endpoint devices within VoLTE-enabled RAN coverage are aggregated per IMS serving area, per call type (e.g., VoLTE to VoLTE in VoLTE-enabled RAN, 3G to VoLTE in VoLTE-enabled RAN, etc.). In one embodiment, aggregation is not performed per eNodeB cell because the mobile terminated user endpoint device's cell site location is unknown in certain failure scenarios (e.g., paging failures). In one embodiment, the percentage of successful call setup attempts made to VoLTE user endpoint devices that are in the coverage VoLTE-enabled RAN is calculated as the number of successful mobile terminated VoIP call setup attempts of a specified type, given that the terminating user endpoint device is in VoLTE-enabled RAN coverage, divided by the number of mobile terminated VoIP call setup attempts of a specified type, multiplied by one hundred.

In one embodiment, a mobile terminated VoIP call setup attempt of a specified type, given that the terminating user endpoint device is in VoLTE-enabled RAN coverage, is considered to be successful when: (1) the terminating user endpoint device is in VoLTE-enabled RAN coverage; (2) the SIP INVITE response from the mobile terminated S-CSCF 214 to the mobile terminated I-CSCF 214 is [200, 404, 480, 484, 486, 487, 600, 603]; and (3) when the SIP INVITE response from the mobile terminated S-CSCF 214 to the mobile terminated I-CSCF 214 is 200 OK, additionally: (a) the 200 OK is not due to call forwarding not reachable at the mobile terminated telecom application server; and (b) the mobile terminated dedicated bearer sets up successfully if the mobile terminates user answered the call, and the time between the session description protocol (SDP) answer and the SIP BYE is shorter that a threshold period of time. In one embodiment, call setup attempts that fail for user-related reasons (e.g., cancelled or declined calls) are considered successful from the network perspective, as are call setup attempts that are forwarded to voicemail for reasons unrelated to the network.

In one embodiment, the number of mobile terminated VoIP call setup attempts of a specified type, given that the terminating user endpoint device is in VoLTE-enabled RAN coverage, is calculated as the number of mobile terminated SIP INVITEs of the specified type observed at the S-CSCF 214 (given that the terminating user endpoint device is in the VoLTE-enabled RAN coverage) minus the number of 3xx responses to the mobile terminated SIP INVITEs of the specified type observed at the S-CSCF 214 (given that the terminating user endpoint device is in the VoLTE-enabled RAN coverage). The number of mobile terminated SIP INVITEs and the number of 3xx responses to the mobile terminated SIP INVITEs may be calculated using the call detail records of the S-CSCF 214. It is noted that the same S-CSCF 214 is traversed multiple times by the SIP INVITE and the 3xx response to the invite; thus, only the mobile terminated SIP INVITEs that arrive at the S-CSCF 214 from the I-CSCF 214 and only the 3xx responses to those invites that are sent by the S-CSCF 214 to the I-CSCF 214 are counted.

In step 308, the AS 104 calculates the percentage of successful call setup attempts made to VoLTE user endpoint devices that are not in the coverage of VoLTE-enabled RAN (e.g., the devices are in 3G, 2G, or CSFB coverage). In one embodiment, the call setup attempts made to VoLTE user endpoint devices not within VoLTE-enabled RAN coverage are aggregated per IMS serving area, per call type (e.g., VoLTE to VoLTE in non-VoLTE-enabled RAN, 3G to VoLTE in non-VoLTE-enabled RAN, etc.). In one embodiment, aggregation is not performed per eNodeB cell because the mobile terminated user endpoint device's cell site location is unknown in certain failure scenarios (e.g., paging failures). In one embodiment, the percentage of successful call setup attempts made to VoLTE user endpoint devices that are not in the coverage of VoLTE-enabled RAN is calculated as the number of successful mobile terminated CS call setup attempts of a specified type, given that the terminating user endpoint device is not in VoLTE-enabled RAN coverage, divided by the number of mobile terminated CS call setup attempts of a specified type, multiplied by one hundred.

In one embodiment, the number of successful mobile terminated CS call setup attempts of a specified type, given that the terminating user endpoint device is not in VoLTE-enabled RAN coverage, is considered to be successful when: (1) the terminating user endpoint device is not within VoLTE-enabled RAN coverage; (2) the SIP INVITE response from the mobile terminated S-CSCF 214 to the mobile terminated I-CSCF 214 is [200, 404, 480, 484, 486, 487, 600, 603]; and (3) when the SIP INVITE response from the mobile terminated S-CSCF 214 to the mobile terminated I-CSCF 214 is 200 OK, additionally: (a) the 200 OK is not due to call forwarding not reachable at the mobile terminated telecom application server. In one embodiment, call setup attempts that fail for user-related reasons (e.g., cancelled or declined calls) are considered successful from the network perspective, as are call setup attempts that are forwarded to voicemail for reasons unrelated to the network.

In one embodiment, the number of mobile terminated CS call setup attempts of a specified type, given that the terminating user endpoint device is in VoLTE-enabled RAN coverage, is calculated as the number of mobile terminated SIP INVITEs of the specified type observed at the CSCF (given that the terminating user endpoint device is not in the VoLTE-enabled RAN coverage) minus the number of 3xx responses to the mobile terminated SIP INVITEs of the specified type observed at the S-CSCF 214 (given that the terminating user endpoint device is not in the VoLTE-enabled RAN coverage). The number of mobile terminated SIP INVITEs and the number of 3xx responses to the mobile terminated SIP INVITEs may be calculated using the call detail records of the S-CSCF 214. It is noted that the same S-CSCF 214 is traversed multiple times by the SIP INVITE and the 3xx response to the invite; thus, only the mobile terminated SIP INVITEs that arrive at the S-CSCF 214 from the I-CSCF 214 and only the 3xx responses to those invites that are sent by the S-CSCF 214 to the I-CSCF 214 are counted.

In step 310, the method 300 ends.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for estimating end-to-end accessibility, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for estimating end-to-end accessibility (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for estimating end-to-end accessibility (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for estimating end-to-end accessibility in a voice over long term evolution network, the method comprising:
aggregating data, by a processor, from a plurality of sources in the network relating to calls originating from and terminating in the network, where the data indicates success rates for a plurality of procedures initiated by placement of the calls; and
calculating, by the processor, a metric indicative of the end-to-end accessibility from the data, wherein the calculating comprises:
computing a percentage of successful call setup attempts made to voice over long term evolution user endpoint devices that are outside of coverage of a voice over long term evolution-enabled radio access network, wherein the metric reflects a measure of success for call setup attempts that are made to the voice over long term evolution user endpoint devices that are outside of the coverage of the voice over long term evolution-enabled radio access network.

2. The method of claim 1, wherein the calculating further comprises:
computing a percentage of successful mobile originated call setup attempts during a period of time.

3. The method of claim 2, wherein the computing the percentage of successful mobile originated call setup attempts during the period of time comprises:
determining a first quantity representing a percentage of successful mobile originated session initiation protocol bearer activation attempts during the period of time;
determining a second quantity representing a percentage of successful mobile originated voice over internet protocol call setup attempts given that the session initiation protocol bearer has been activated successfully during the period of time;
multiplying the first quantity by the second quantity to obtain a third quantity; and
dividing the third quantity by one hundred.

4. The method of claim 3, wherein the determining the second quantity comprises:
dividing a number of successful mobile originated voice over internet protocol call setup attempts of a given type by a number of mobile originated voice over internet protocol call setup attempts of the given type.

5. The method of claim 4, wherein the given type is voice over long term evolution to voice over long term evolution.

6. The method of claim 4, wherein the given type is voice over long term evolution to non-voice over long term evolution.

7. The method of claim 1, wherein the calculating further comprises:
computing a percentage of successful call setup attempts made to voice over long term evolution user endpoint devices that are within coverage of a voice over long term evolution-enabled radio access network.

8. The method of claim 7, wherein the computing the percentage of successful call setup attempts made to the voice over long term evolution user endpoint devices that are within coverage of the voice over long term evolution-enabled radio access network comprises:
determining a first quantity representing a number of successful mobile terminated voice over internet protocol call setup attempts of a specified type, given that a terminating user endpoint device is within coverage of the voice over long term evolution-enabled radio access network;
determining a second quantity representing a number of mobile terminated voice over internet protocol call setup attempts of the specified type;
dividing the first quantity by the second quantity to obtain a third quantity; and
multiplying the third quantity by one hundred.

9. The method of claim 8, wherein the specified type is voice over long term evolution to voice over long term evolution within coverage of the voice over long term evolution-enabled radio access network.

10. The method of claim 8, wherein the specified type is 3G to voice over long term evolution within coverage of the voice over long term evolution-enabled radio access network.

11. The method of claim 1, wherein the computing the percentage of successful call setup attempts made to the voice over long term evolution user endpoint devices that are outside of coverage of the voice over long term evolution-enabled radio access network comprises:
determining a first quantity representing a number of successful mobile terminated circuit switched call setup attempts of a specified type, given that a terminating user endpoint device is outside of coverage of the voice over long term evolution-enabled radio access network;
determining a second quantity representing a number of mobile terminated circuit switched call setup attempts of the specified type;
dividing the first quantity by the second quantity to obtain a third quantity; and
multiplying the third quantity by one hundred.

12. The method of claim 11, wherein the specified type is voice over long term evolution to voice over long term evolution outside of coverage of the voice over long term evolution-enabled radio access network.

13. The method of claim 11, wherein the specified type is 3G to voice over long term evolution outside of coverage of the voice over long term evolution-enabled radio access network.

14. A non-transitory computer-readable storage device storing a plurality of instructions which, when executed by a processor of a server, cause the processor to perform operations for estimating end-to-end accessibility in a voice over long term evolution network, the operations comprising:
aggregating data from a plurality of sources in the network relating to calls originating from and terminating in the network, where the data indicates success rates for a plurality of procedures initiated by placement of the calls; and
calculating a metric indicative of the end-to-end accessibility from the data wherein the calculating comprises:
computing a percentage of successful call setup attempts made to voice over long term evolution user endpoint devices that are outside of coverage of a voice over long term evolution-enabled radio access network, wherein the metric reflects a measure of success for call setup attempts that are made to the voice over long term evolution user endpoint devices that are outside of the coverage of the voice over long term evolution-enabled radio access network.

15. The non-transitory computer-readable storage device of claim 14, wherein the calculating further comprises:
   computing a percentage of successful mobile originated call setup attempts during a period of time.

16. The non-transitory computer-readable storage device of claim 15, wherein the computing the percentage of successful mobile originated call setup attempts during the period of time comprises:
   determining a first quantity representing a percentage of successful mobile originated session initiation protocol bearer activation attempts during the period of time;
   determining a second quantity representing a percentage of successful mobile originated voice over Internet protocol call setup attempts given that the session initiation protocol bearer has been activated successfully during the period of time;
   multiplying the first quantity by the second quantity to obtain a third quantity; and
   dividing the third quantity by one hundred.

17. The non-transitory computer-readable storage device of claim 14, wherein the calculating further comprises:
   computing a percentage of successful call setup attempts made to voice over long term evolution user endpoint devices that are within coverage of a voice over long term evolution-enabled radio access network.

18. An apparatus for estimating end-to-end accessibility in a voice over long term evolution network, the apparatus comprising:
   a processor; and
   a non-transitory computer-readable storage device storing a plurality of instructions which, when executed by the processor, cause the processor to perform operations, the operations comprising:
      aggregating data from a plurality of sources in the network relating to calls originating from and terminating in the network, where the data indicates success rates for a plurality of procedures initiated by placement of the calls; and
      calculating a metric indicative of the end-to-end accessibility from the data, wherein the calculating comprises:
         computing a percentage of successful call setup attempts made to voice over long term evolution user endpoint devices that are outside of coverage of a voice over long term evolution-enabled radio access network, wherein the metric reflects a measure of success for call setup attempts that are made to the voice over long term evolution user endpoint devices that are outside of the coverage of the voice over long term evolution-enabled radio access network.

* * * * *